US005582501A

United States Patent [19]

Meyer

[11] Patent Number: 5,582,501

[45] Date of Patent: Dec. 10, 1996

[54] FORK LIFT AND METHOD FOR OPERATING AND TRANSPORTING SAME

[75] Inventor: Winfried H. Meyer, Palm Beach Gardens, Fla.

[73] Assignee: Otto Meyer & Sons, Inc., Palm Beach Gardens, Fla.

[21] Appl. No.: 158,032

[22] Filed: Nov. 24, 1993

[51] Int. Cl.[6] .................... B60P 1/00

[52] U.S. Cl. .................... 414/491; 414/685; 414/914; 414/549; 280/405.1; 280/415.1; 280/479.1; 280/756

[58] Field of Search .................... 414/685, 914, 414/628–632, 634–638, 663, 608, 679, 491, 498, 673, 549; 280/405.1, 81.1, 415.1, 416.1, 32.5, 479.1, 756; 180/333, 906, 65.2, 308

[56] References Cited

U.S. PATENT DOCUMENTS

| | | | |
|---|---|---|---|
| 2,822,931 | 2/1958 | Sparrow . | |
| 2,990,072 | 6/1961 | Mindrum . | |
| 3,126,209 | 3/1964 | Jewell et al. | 280/149.2 |
| 3,493,136 | 2/1970 | Spellman, Jr. . | |
| 3,525,447 | 8/1970 | Witikko . | |
| 3,638,817 | 2/1972 | Corompt . | |
| 3,850,473 | 11/1974 | Huber | 180/89.1 |
| 3,940,213 | 2/1976 | Smith | 180/308 X |
| 4,033,625 | 7/1977 | Fikse | 280/149.2 X |
| 4,130,211 | 12/1978 | Abascal . | |
| 4,204,697 | 5/1980 | Santerre | 280/149.2 |
| 4,249,843 | 2/1981 | Kerr . | |
| 4,417,841 | 11/1983 | Chadwick | 414/491 X |
| 4,470,476 | 9/1984 | Hunt | 180/65.2 |
| 4,674,944 | 6/1987 | Addleman . | |
| 4,752,179 | 6/1988 | Seaberg . | |
| 4,932,831 | 6/1990 | White et al. | 901/1 X |
| 4,943,203 | 7/1990 | Bohata . | |
| 4,964,780 | 10/1990 | Karvonen . | |
| 4,986,387 | 1/1991 | Thompson et al. . | |
| 4,993,912 | 2/1991 | King et al. | 901/1 X |
| 5,131,483 | 7/1992 | Parkes | 180/333 X |

FOREIGN PATENT DOCUMENTS

| | | | |
|---|---|---|---|
| 4166435 | 6/1992 | Japan | 414/491 |

*Primary Examiner*—Donald W. Underwood
*Attorney, Agent, or Firm*—Malin, Haley, DiMaggio & Crosby, P.A.

[57] ABSTRACT

An improved, self-propelled fork lift having a variable wheelbase, a tilting and leveraged platform, and a translating fork carriage, all under hydraulic control, to permit load positioning for maximum stability, minimum turning radius, and good tractive force despite a relatively low ratio of vehicle weight to loaded condition. The improved fork lift is towable at highway speeds and is collapsible for mounting beneath the mid section of a semi trailer.

7 Claims, 14 Drawing Sheets

FORK LIFT AND METHOD FOR OPERATING AND TRANSPORTING SAME

BACKGROUND OF THE INVENTION

1. Field of the Invention

The present invention is directed to an improved fork lift that is light-weight, leveraged (i.e., does not require counter weights), self-propelled, towable at highway speeds and compact enough to be mounted beneath trailer beds. The invention is also directed to a method for operating and transporting the improved fork lift.

2. Description of the Background Art

Significant problems may be encountered when transporting conventional fork lifts to or from work sites. Most fork lifts are provided with large counterweights and, therefore, are extremely heavy and require large, powerful vehicles for towing. Because of their weight and size, they often cannot be towed safely at highway speeds, and they then need to be carried on trailers having ramps and/or tilting beds.

Some conventional fork lifts can be secured directly to the rear of a truck or semi trailer. However, these types of fork lifts can only be used with trucks or semi trailers having a special mounting attachment and which are capable of supporting the weight of the fork lift (including some counterbalance weight) overhanging, i.e., protruding, from the extreme rear end of the truck. Further, the most efficient semi trailers have their wheels at the extreme rear of the semi trailer to provide the longest wheel base and the greatest carrying capacity. Conventional fork lifts cannot be carried at the rear end of these types of semi trailers inasmuch as the rear wheels interfere with the mounting assembly for the fork lift.

SUMMARY OF THE INVENTION

An object of the present invention is to provide a very light weight fork lift which can be towed safely at highway speeds, as can any conventional trailer of the same weight, and by pick-up size vehicles or even behind loaded light-to-medium capacity trucks.

A further object of the invention is to provide a fork lift that can be folded to a very low profile to facilitate transporting the fork lift beneath the deck and/or frame of a semi-trailer in the mid-section between semi dollies and rear wheels.

Still another object of the invention is to provide a fork lift with no counterbalance weights and which is capable of lifting extremely heavy loads.

These and other objects are achieved according to the present invention which comprises a light—approximately 2000 lbs.—fork lift having highway tires and drive axles. A steerable wheel can be elevated when the device is towed behind a vehicle. Alternatively, the fork lift can be compacted and mounted beneath the mid section of a semi trailer.

The fork lift of the present invention fundamentally alters the configuration of a conventional fork lift, using a leveraged support system to eliminate counter-weights, and a tilting platform with a translating fork lift carriage and moveable rear axle. While this modification of the conventional fork lift design does restrict the fork lift's use to limited lift-heights, its use for loading and unloading at normal bed heights is retained and the lift capacity is not diminished. In fact, the lift capacity of the fork lift of the present invention is comparable to much heavier conventional (heavily counterbalanced) fork lifts.

The invention might be best realized by mounting the device on a 3 wheel drive chassis with steerable third wheel or a 4 wheel drive chassis with two steerable wheels. The combined effects of a variable wheel-base and translating fork carriage—all under hydraulic control, for example—allow load positioning for maximum stability, minimum turning radius, and good tractive force despite the low ratio of unloaded vehicle weight to loaded vehicle weight. The two-wheel axle with traction locking differential may be driven directly by a hydraulic motor (which is driven directly by a combustion engine or by an electric motor), and may be of standard manufacture in a ¾ or 1 ton pickup truck series. Driving hydraulic motors with combustion engines or electric power sources is well known in the art and will not be detailed here. A splined drive shaft coupling could be included to allow a quick disconnect mechanism to isolate the differential for towing while the steerable wheel is raised off the ground through the tow bar mechanism, the moveable axle being positioned to support the weight of the vehicle while in tow. The retractable axle-moving cylinders also allow the carriage-bearing platform to reach ground level with less inclination so that loads are moved more easily to a position that places the weight above the two wheel axle when the cylinders are extended.

The load bearing platform corresponds somewhat to a conventional fork lift mast that could be tilted to an extreme angle from vertical, except that the fork tilting means of the instant invention is mounted on the carriage on the apron side of the mast and has greater travel than conventional tilting means.

The platform also differs from a conventional fork lift mast in that carriage rollers are provided external to the mast, thus allowing the mast to be relatively flat instead of the usual channel shape with internal rollers. This flattened design is helpful in realizing a very low profile when other elevated members of the device are folded down toward the base frame of the fork lift. This design is intended to provide a fork lift that will fit securely under the mid section of a semi-trailer with the wheels of the fork lift situated under the deck on opposite sides of the two longitudinal "I" beams (or channels) extending along the length of conventional flat bed semi-trailers and with the frame and superstructure of the fork lift drawn up against the "I" beams while being transported. The remaining parts of the fork lift would fit beside the "I" beams and would be secured in that position, the prongs of the fork lift extending vertically along the outside edge of trailer bed and the shanks of the forks lying horizontal or prone.

Leveraging of loads while loading or unloading may be accomplished by resting the shoes attached to the platform end upon the ground or on the bed of the vehicle being serviced. This works easily with single side pallets such as used in the sod industry. The shoes can be provided with a simple locking clamp that attaches to the stake pocket support frames that extend along the sides of nearly all conventional flat-bed units so as to add safety and permit handling double-side pallets used in general freight operations. Where the semi-trailer is not provided with stake pocket support rails, an alternative maneuver might be needed. For example, inserting forks and lifting the outside edge of a pallet only slightly would allow a support to be inserted or wedged outboard of the shoes to provide platform support.

Another feature of the invention, particularly helpful when inserting forks on rough or uneven surfaces, can be obtained by by-passing the lifting cylinders on one side of the platform and causing the forks to be tilted laterally to a desired angle before lifting with cylinders on both sides of the platform. This maneuver can be accomplished using a selector valve that momentarily interrupts the flow of hydraulic fluid to cylinders on one side of the fork lift. It would also permit tilting a loaded set of forks to a more favorable center of gravity while traversing rough ground or along an inclined surface. Problems associated with an elevated load (e.g., a high center of gravity) would be significantly lessened. Tilting the platform laterally also leans the pallet away from adjacent objects, eliminating the need for side-shift mechanisms in most cases.

Additional advantages of the inventive fork lift include minimum damage to surfaces over which the fork lift travels, low fuel consumption and/or efficient use of battery operated power sources, and in transportation by aircraft or where basic machine weight is an important factor, light weight without sacrificing significant lifting ability.

There are also safety features inherent in the design for carrying beneath the vehicle deck. Besides being supported by four cylinders with locking valves holding the folded fork lift tightly against the carrying vehicle underframe and safety chains to reinforce security, any serious, albeit unlikely, complete structural failure would cause the fork lift to fall in front of the rear wheels of the semi rather than in front of following traffic, as in a rear mounted lift mishap. Such an unlikely disaster could be prevented by providing a warning system to warn the driver if any of the four contact points of the carried vehicle are loosened from firm contact with semi's underframe—such as audible sensors and/or warning lights. A fail-safe system is, therefore, virtually insured.

BRIEF DESCRIPTION OF THE DRAWINGS

The present invention is described in detail below with reference to the accompanying drawings, in which.

DETAILED DESCRIPTION OF THE INVENTION

Figure 1A:
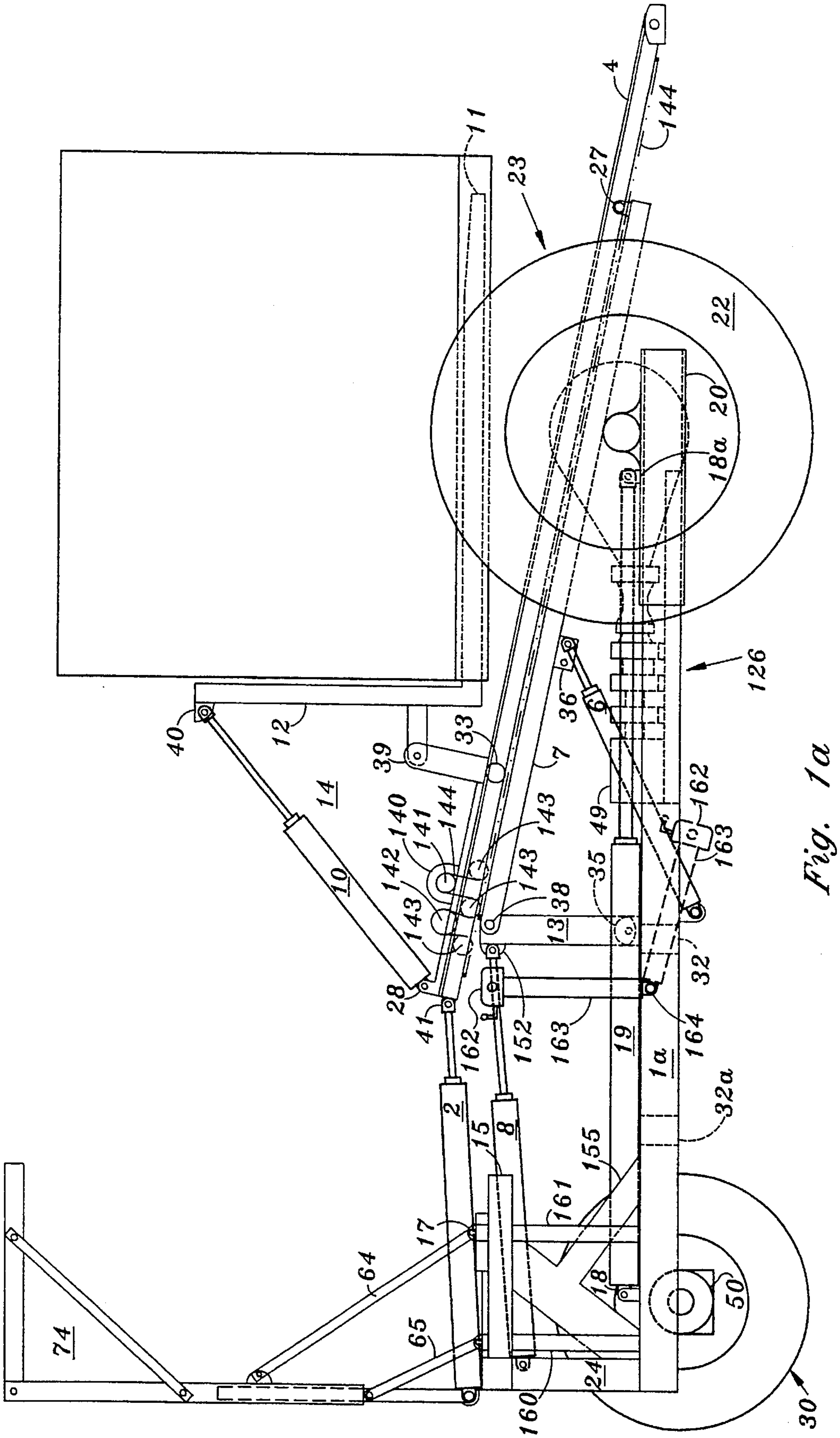
FIG. 1*a* is an operator side view of the inventive fork lift vehicle carrying a load and showing a partial profile of the differential drive system.
Figure 1B:
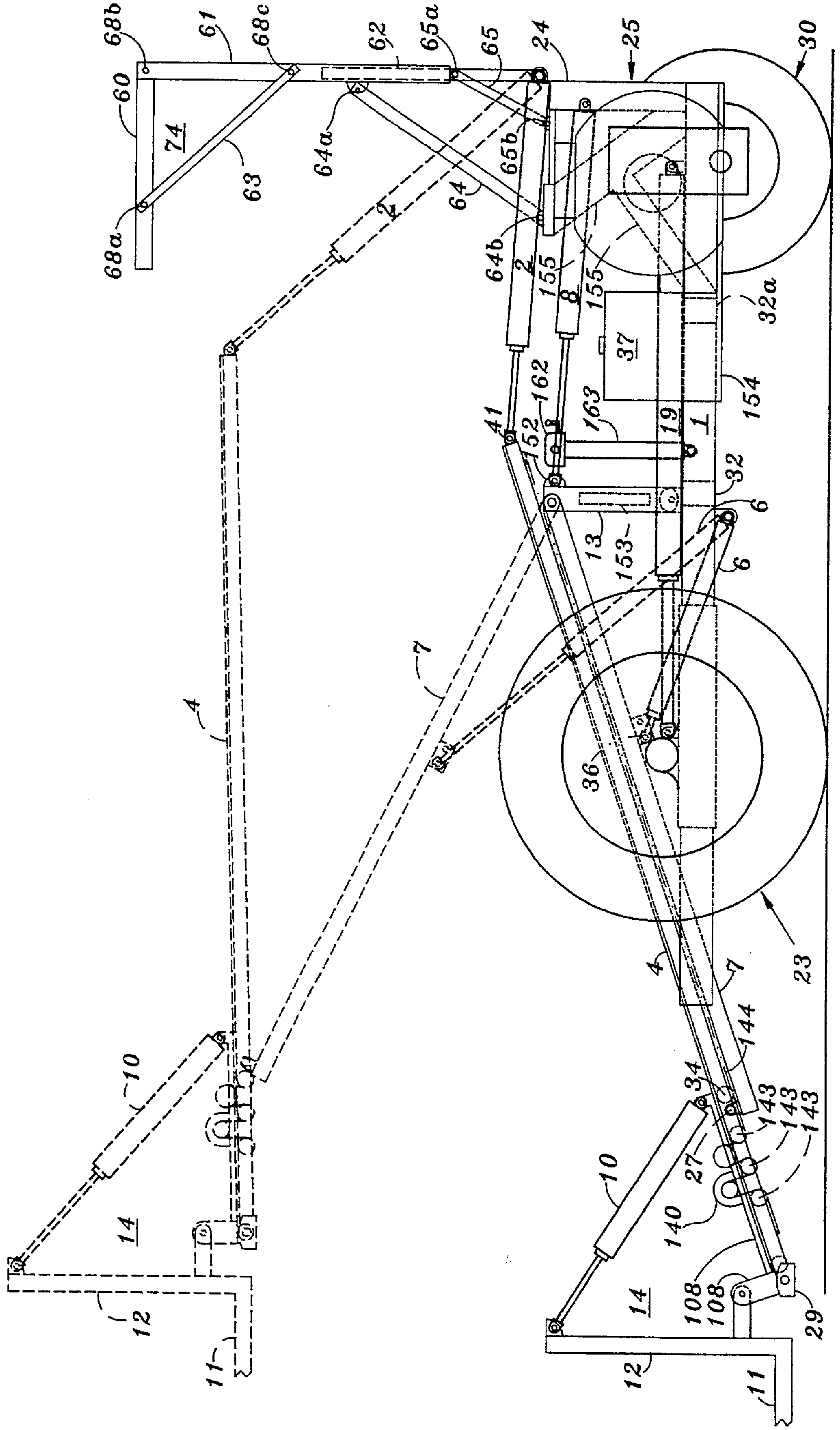
FIG. 1*b* is a view from the engine side of the fork lift showing lowered and elevated positions of the platform and an operator protection framework.
Figure 2:
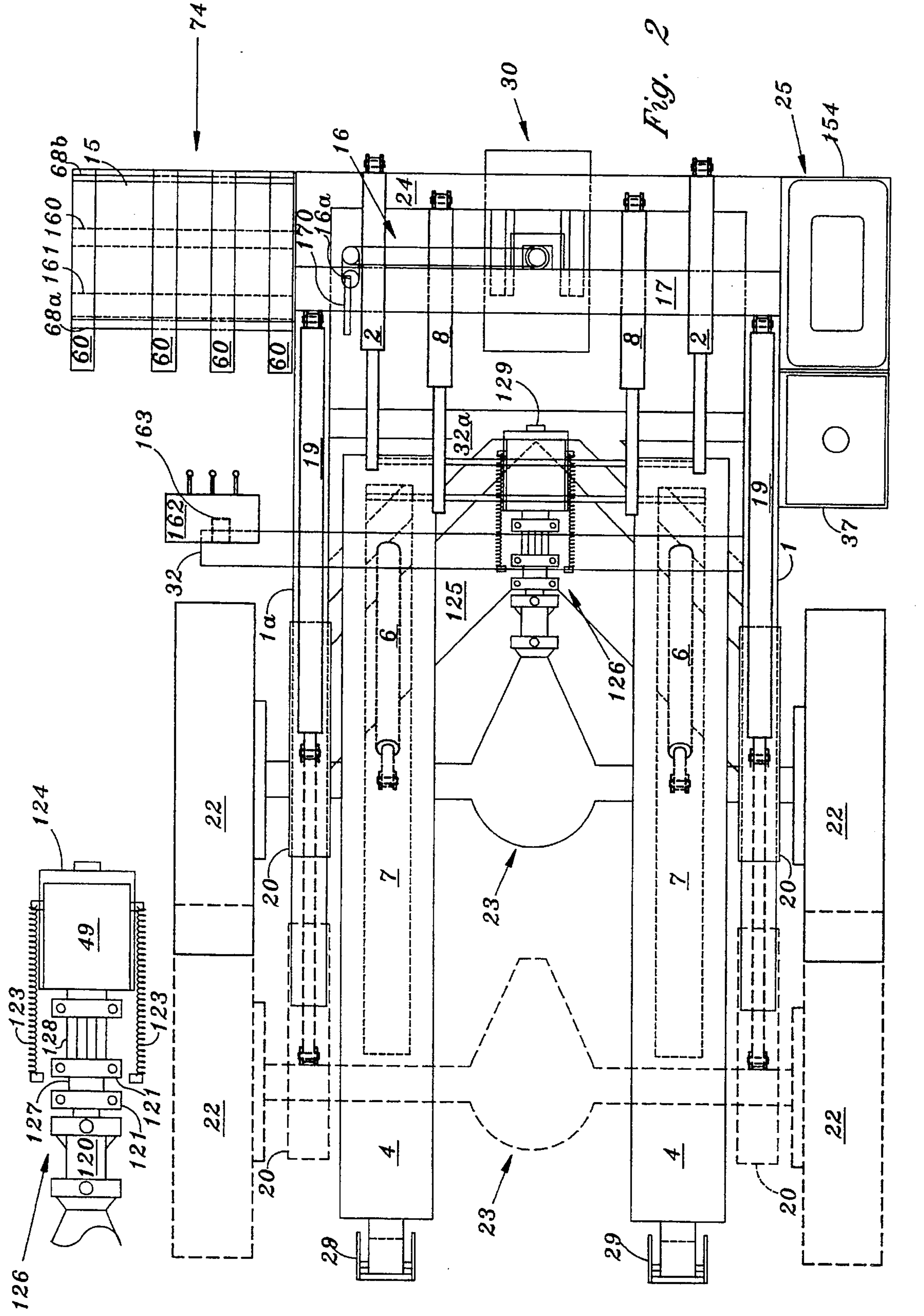
FIG. 2 is a plan view of the fork lift showing the variable wheelbase and two wheel drive system.
Figure 3:
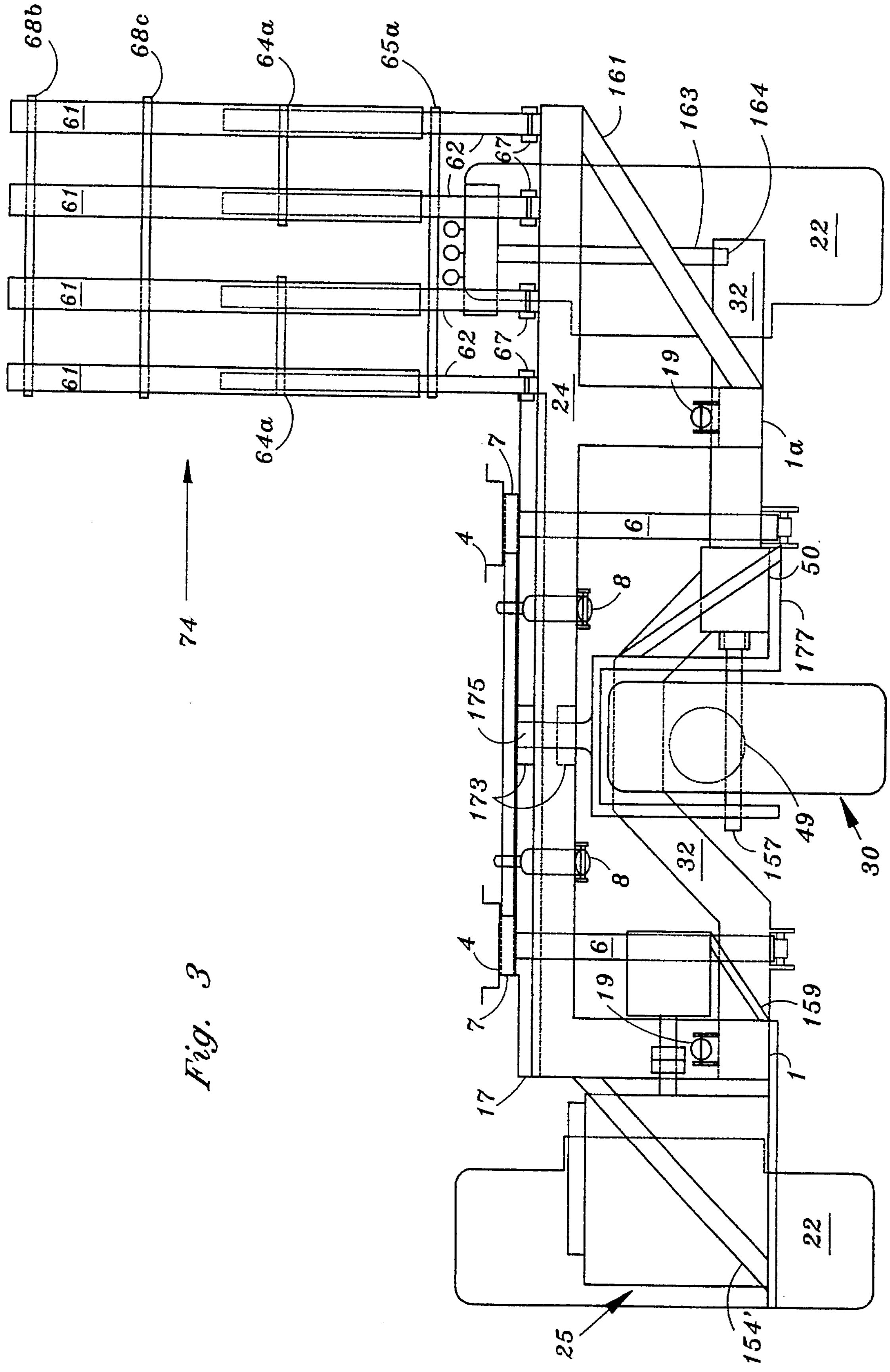
FIG. 3 is a view from the steerable wheel end of the fork lift.

FIGS. 1*a*, 1*b*, 2 and 3 show a chassis of tubular framework consisting of two longitudinal sections 1 and 1*a* extending in parallel and connected by a cross-over frame section 32*a* seen in FIG. 2 and several arching frame segments 17, 24 and 32 best seen in FIG. 3. The two wheel assembly 23, as shown in FIG. 2, joins side members 1 and 1*a* by attachment to sliding sleeves 20 that are slidably mounted on members 1 and 1*a*. These provide rigidity to that section of the chassis that has no fixed cross members and serve as means to vary the wheel base while contributing to a light weight but strong chassis construction.

FIG. 1*a* shows a profile of the fork lift from the operator's side with a load in position for carrying. The position for operating is shown offset from the frame chassis and on the opposite side from the engine shown in FIGS. 2 and 3. The operator's seat 15, protector framework 74 and control valve stand 163 are supported by frame 1*a* in outboard locations by extensions of frame members 24 and 32 and by braces 160, 161, 64, and 65, respectively. Details of the section showing steerable wheel assembly 30 are shown in later figures. One each of five pairs of hydraulic cylinders 2, 6, 8, 10 and 19 are shown in attached positions for functions described later. Valve stand 163 and control valves 162 are shown pivoted on mount 164 and in a prone, alternate position in outline. This position is used when other superstructure elements are folded down for transportation by carrying vehicles. Also in outline are components of the two wheel axle assembly 23 and the drive train components of the assembly 126. Assembly 14 comprising the carriage with mounted forks and tilting means is driven by hydraulic motor 140 and travels on strands of chain 144, fastened near ends of supporting platform 4 and engaging an assemblage of sprockets 143. The carriage is supported on platform 4 by rollers 33 riding in channels of platform 4 and retained on platform 4 by rollers 34 (see FIG. 1*b*) under outboard flanges of platform 4.

FIG. 1*b*, which is a profile from the engine side of the fork lift, shows the fork lift with a shortened wheelbase accomplished by retracting hydraulic cylinders 19 which are mounted to chassis frames at attachments 18 and to sleeves at attachments 18*a* as shown in FIG. 1*a*. The shortened wheelbase permits lift arms 7, pivotally mounted at 38 on stand 13, to lower platform 4 which is pivotally mounted to arms 7 at mount 27. Shoes 29, pivotally mounted on the distal end of platform 4 will reach the ground and provide support for loads being picked up on fork assembly 14 for translating the load to a carrying position at the proximate end of the platform 4 as well as providing support for depositing loads on the ground.

Cylinders 2, attached pivotally to frame 24 and pivotally to platform 4 at mounts 41, control the proximate end of platform 4. Cylinder 6, pivotally attached at cross-member 32 of frame and to lift arms 7 at shackles 36, control elevation of platform 4. When cylinders 6 are extended, lift arms 7 pivot where mounted on stand 13 and raise platform 4 to the position shown in outline, which is a height used to service most load-carrying vehicles. Cylinders 2 follow the arc of lift arms 7 and can be operated to keep platform 4 parallel to the ground. During changes of elevation, the cylinders 10 are used to maintain the load in a level position, pivoting where attached to the carriage at 28 and to shanks 12 of forks at mount 40 as shown in FIG. 1*a*.

Cylinders 8, pivotally mounted on frame 24 and pivotally attached to stand 13 at the offset 152, serve to brace stand 13 in an upright position or with stand 13 pivoting at 35 as shown in FIG. 1*a*, may be retracted to achieve slightly greater elevation than the outline shows by further rotation of the base of each cylinder 6. Retraction of cylinders 8 also facilitates servicing vehicles with low deck heights by maintaining the horizontal position of platform 4 at lower levels.

Engine and pump assembly 25 and fuel tank 37 are shown supported by base 154 welded to frame 1 and to frame 24. Reference numeral 153 indicates cross-bracing to strengthen the two stands 13 mounted on 1 and 1*a* by joining them as a unitary structure.

The procedure for picking up and depositing a load at ground level is similar to standard fork lift operation. The forks are positioned low enough to enter or exit pallets or loads but just above the surface of the ground and are driven under or removed from below the load. The conventional lifting technique changes with the present invention as loads are first moved with the tilting action of the carriage forks, accomplishing weight transfer to or from load-carrying rollers 33 of the carriage. Picking up the load places the weight on the platform shoes on the ground until the carriage is translated to a load-carrying position and the axle is extended to provide vehicle stability and the shoes are lifted for traveling. Depositing loads reverses this procedure.

To operate at deck levels, the shoes are placed on the vehicle being serviced for support while loading or unloading and the carriage is moved to enter or exit from beneath the load and to move to the proper position while the forklift remains stationary. The fork lift is moved only when no support is needed at the distal end of the platform 4, as by the shoes.

FIG. 2 shows a retracted position of axle control cylinders 19 with wheels 22, and an outline of an extended position of assembly 23. Means for steering (assembly 16) is shown in simplified form with a tiller 170. The illustrated steering employs a torque energizer but other means of power steering could also be employed. The motor 49 and drive train assembly 126, which power assembly 23, are supported by frame 125 which is welded to sleeves 20, and is shown in FIG. 2. Assembly 126 includes a decoupling mechanism 128 on shaft 127, which shaft 127 is supported by bearings 121 and joined by U joint assembly 120 to the differential. Splined coupler 128 has internal splines that mesh with external splines on shaft 127 and the output shaft of motor 49. This mechanism is used only when the fork lift vehicle is to be towed.

FIG. 3 shows the pump and engine assembly 25 coupled for working the hydraulic system, a brace 159 for supporting the pump and an oblique brace 154' of the base for supporting engine assembly 25 are shown. Cross-member 32 is shown arched in its central section to allow passage of the drive motor 49 when axle assembly 23 is fully retracted. FIG. 3 also provides a simplified view showing how the steerable wheel assembly is mounted and showing the drive motor 50 for propelling the wheel. Another view of the operator protector assembly 74 and valve stand 163 with supporting structure 161 is also provided. Frame members 61 are shown in place over adapters 62 which are pinned to frame 24 by pins 67. Other pins 64*a* through 68*c* secure the rigid structure of the framework.

Figure 4:
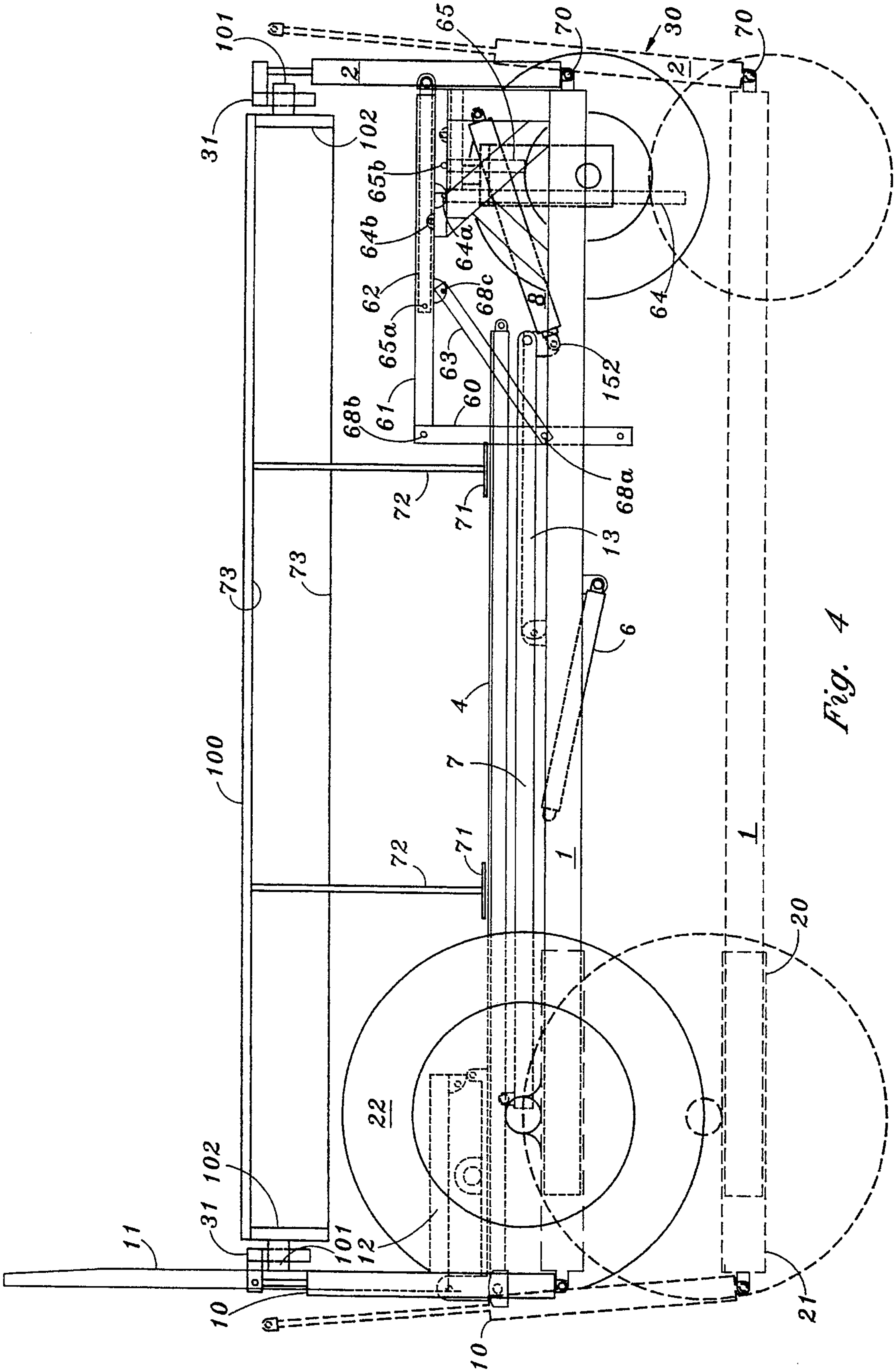
FIG. 4 is a side view of the fork lift chassis beneath a semi trailer showing the fork lift on the ground and in a carrying position supported by mounting means.

FIG. 4 shows the fork lift chassis on the ground in outline and the fully folded fork lift in a mounted position beneath a semi trailer. The following is a description of a method designed to be universally adaptable without modification to a semi trailer when stake pocket rails are available for lifting the fork lift. Several pairs of adapters are required, including tube inserts 21 for attaching cylinders 10 to distal ends of frames 1 and 1*a*, adapters 31 for attaching piston ends of cylinders 10, and adapters 31 for attaching cylinder 2 piston ends to the stake pocket railing on each side of the semi trailer.

Protector frame 74 is first collapsed into a carrying position by removing pins 64*a* and 65*a* as shown in FIG. 3 and sliding tube members 61 down on adapters 62. Then the framework will fold into the position shown and be part of a reduced profile of the fork lift. Cylinders 2 will be removed from operational positions and relocated to attach their base ends to proximate ends of frames 1 and 1*a* at mounts 70. Cylinders 10 also will be relocated to attach base ends to adapters 21. Forks 11 are tilted upright by hand so shanks 12 can be pinned to carriage in a prone position. Cylinders 6 are detached from lift arms 7 at shackle mounts, and cylinders 8 are retracted to pull down stands 13, bringing lift arms 7 and platform 4 to a folded position to complete the reduced profile. The procedure for remote control described in FIG. 14 details using the hydraulic and electric circuitry then allows the operator to maneuver the fork lift beneath the semi trailer deck and frame and to extend or retract the cylinders 2 and 10 to attach same to rail adapters 31. Closing cylinders 2 and 10 to completes the lifting operation so that the fork lift is positioned in the proper carrying position.

The stake pocket rails 101 are standard features of flat bed semi trailers and are welded to side members 102 of the semi deck along the entire length of the trailer. Other details shown are cross members 73 of the semi. Deck 100 is supported by cross members 73 and has side members 102 attached. I beams 72 are shown in an end view. These I beams, or in some cases channels, extend the length of the semi trailers and are the main supportive components to which cross members 73 are attached. Flanges 71 at the bottom of the I beam or channels provide surfaces to which the folded mid-section of the fork lift is held. The end sections of the fork lift with wheels' and other components are fit outside of I beams and under the deck.

Figures 5A, 5B, 5C:
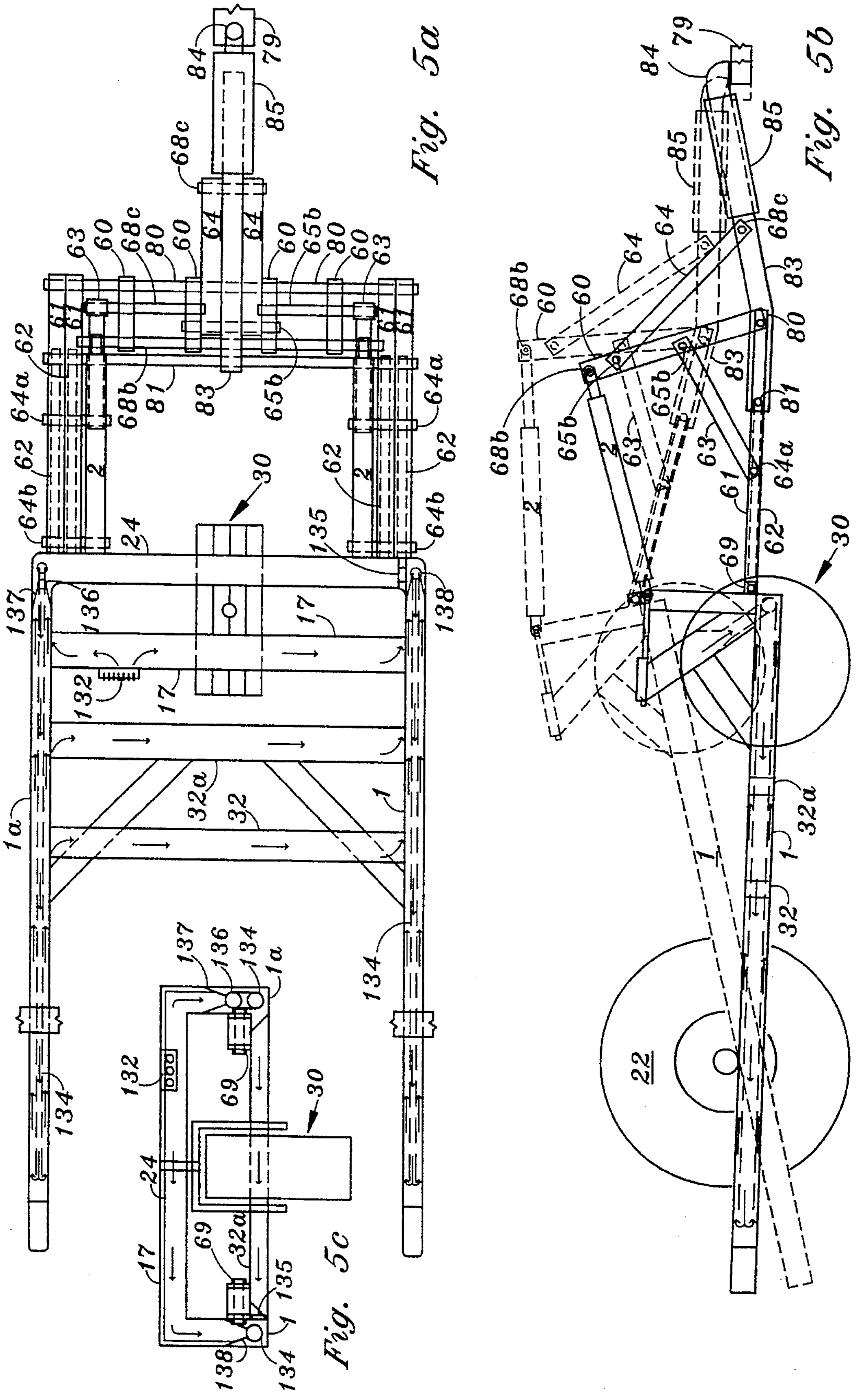
FIG. 5*a* is a plan view of the operator protection framework re-assembled as a towing mechanism on the fork lift and a plan view of the fork lift frame used as a hydraulic reservoir.
FIG. 5*b* is a side view of the tow bar means used to elevate the steerable drive wheel and a side view of frame reservoir.
FIG. 5*c* is an end view of the frame as a hydraulic reservoir.

FIGS. 5*a*, 5*b* and 5*c* are plan, profile and end views, respectively of the operator protection assembly re-assembled for use as a tow bar and steerable wheel elevator. To utilize members of framework 74 and so avoid carrying an additional structural framework used only for towing, a disassembly of protector 74 is required and may be illustrated with some reference to FIG. 3. The pins described in FIG. 3 as providing framework rigidity are removable and can be used to reassemble the protector as a tow bar as follows. Removing pins 68*a* (refer to FIG. 1*b*), 68*b* and 68*c* allow separation of members 60, 61, and 63. Pulling pins 64*a* and 65*a* permit telescoping members 61 down on adapters 62. If pins 67 are removed, two pairs of 61 and 62 combinations may be moved and attached with pins 64*b* at mounting positions 69 on upright frame sections of frame 24. Braces 63 of protector 74 now may be pinned to the two pairs of 61 and 62 by pins 64*a*. The four members 60 are now pinned to the two members 63 by one pin 65*b* and one pin 68*c*. Members 60 are also attached to the piston ends of cylinders 2 by pin 68*b* after cylinders 2 have been detached from operating connections to platform 4 and pivoted for use as tow bar lifting means.

Several items not part of protector 74 must be employed to adapt the framework to a towing vehicle. These are light and easily handled and provide the hitch 84 for ball or ring attachment on the towing vehicle tow point 79 and the brake activator unit 85 that applies pressure to the brake cylinders of fork lift assembly 23 for slowing or stopping when towing vehicle brakes are applied. Activator 85, a standard device, is a part of the tow bar adaptor 83 and also functions as a break-away safety feature in case of hitch failure.

Adaptor 83 is secured to members 60 and 61 with two long pins 80 and 81 that are not part of the operator protection framework. Final bracing of the reassembled tow bar is provided by two members 64 pinned to members 60 by a pin 65*b* and to adaptor 83 by a pin 68*c*.

The fork lift is now maneuvered to engage a hitch on the towing vehicle, and cylinders 2 are extended. This forces the tow bar hitch down on the towing vehicle mount and elevates the steerable wheel assembly 30 to a safe towing height, pivoting the fork lift on axle assembly 23. With de-coupling of the splined drive shaft to the two wheel differential, and with the addition of lights and safety chains, the fork lift is now ready to be towed at highway speeds.

To describe de-coupling of the drive shaft, further explanation of the drive train assembly 126 (see FIG. 2) is required. A short section of a splined and slip type drive shaft 120 with U-joints on both ends connects the differential of the two wheel assembly 23 to the shaft 127 which is supported by two bearings 121 provided on the assembly frame 125. The U joint assembly 120 relieves stress on the differential caused by torsion or mis-alignment as occurs in conventional drive train assemblies. Frame 125 is welded to sliding boxes 20 which slide on the frames 1 and 1*a*.

Shaft 127 has external splines on one end which mesh with internal splines of the coupler sleeve 128 which sleeve is fastened to the output shaft of hydraulic motor 49. The outboard bearing shown in FIG. 2 may not be needed if the motor has such a bearing. The splines on shaft 127 and the coupler sleeve 128 should be beveled for synchronizing engagement.

Hydraulic motor 49 is bolted to sliding base 124 which can move on frame 125 but is held by the springs 123 in a coupled position for driving the fork lift. To de-couple the motor 49 for towing purposes, the sliding base 124 is attached to frame 32*a* at fastener 129, the two wheel assembly 23 is locked with wheel brakes, the steering assembly 30 is allowed to float free, and the cylinders 19 hold the shafts apart while the fork lift is being towed.

To re-couple the motor 49 at the job site, the latch 129 is released, and operating valves for cylinders 19, assembly 30 and motor 49 are placed in float positions. Springs 123 should then pull shaft 127 and coupler 128 into the aligned, coupled position. If the shaft 127 and coupler 128 are not perfectly aligned, a slight rotation of the motor output shaft will permit the springs 123 to re-couple the shaft 127 and coupler 128.

FIGS. 5*a*, 5*b* and 5*c* show parts of the frame being used as a reservoir for hydraulic fluid, including the fluid routing and other components of a fluid temperature regulating system. The frame components hold approximately ten gallons of hydraulic fluid which is sufficient. A section of frame 17 serves as a manifold for return and case drain lines 132.

Internal pipes 134 that extend nearly the full length of frame members 1 and 1*a* direct circulation to the blunt ends of those members 1 and 1*a* where the fluid is returned between the internal pipes 134 and the interior of the frame members 1 and 1*a*. Frame arch 17 normally directs flow to both members 1 and 1*a*, while cross over frames 32 and 32*a* transfer fluid from member 1*a* to 1 and finally to the suction outlet 135 where the filter and pump are connected. Frame arch 24 serves as additional reservoir capacity.

A shut off valve 136 is positioned on the operator's side of the fork lift, just below a pipe adaptor block 137 which feeds into the frame 1*a*. Half of the fluid returned from the actuators and other hydraulic components flow into 1*a*. The balance of the fluid normally flows from the manifold on section 17 to frame 1 through pipe adaptor block 138.

When valve 136 is closed by the operator, all fluid is directed on return to the plumbing of frame 1, and circulation is reduced by half volume. This permits the viscosity of the hydraulic oil to be quickly raised when ambient and initial operating temperatures are low. As the fluid warms, or in generally hot weather, an open valve 136 doubles the circulation and radiant cooling to prevent the oil from overheating.

Figure 6:
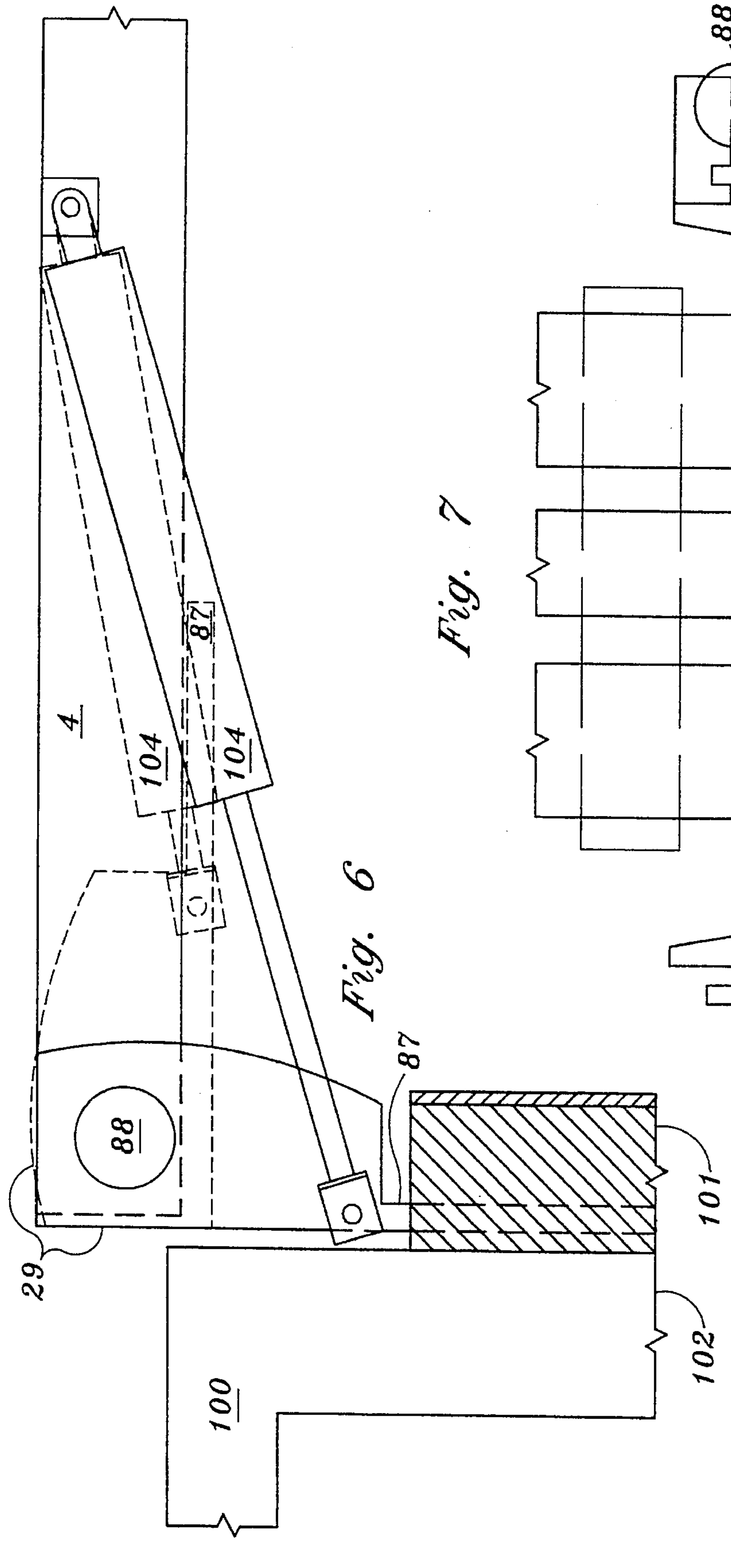
FIG. 6 is a side view of the shoes and an associated hydraulic means for controlling the position of the shoes.

FIG. 6 shows a detailed profile of an end of platform 4 with shoes 29 in two positions and hydraulic means to achieve these positions.

Figure 7:
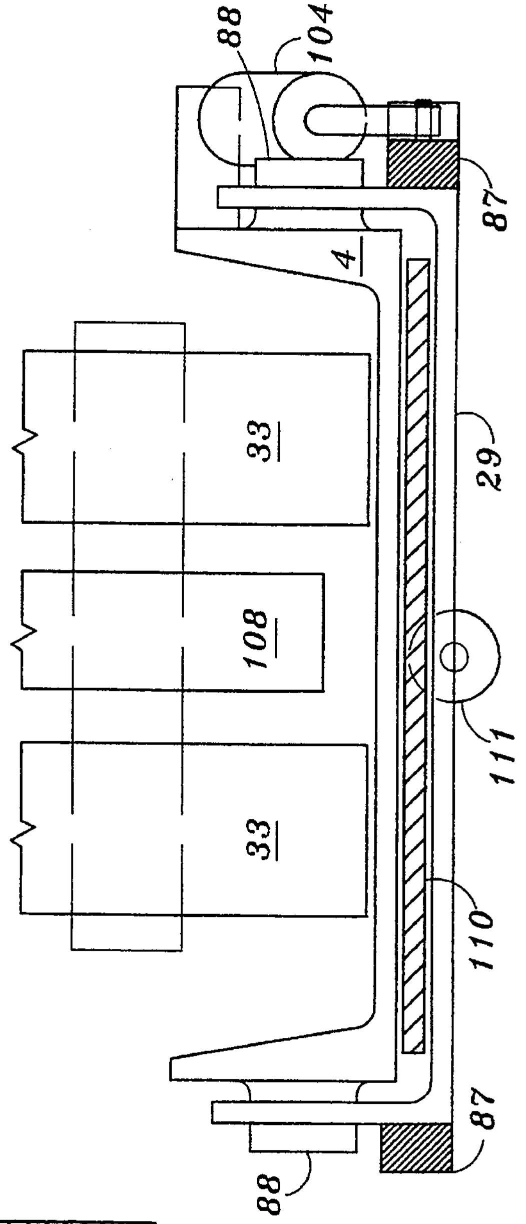
FIG. 7 is an end view of one platform rail and the hydraulic means at the flange of the rail for controlling the position of the shoe.

FIG. 7 shows an end view of one rail of the platform 4 with one hydraulic means on the flange.

Figures 8, 9, 10:
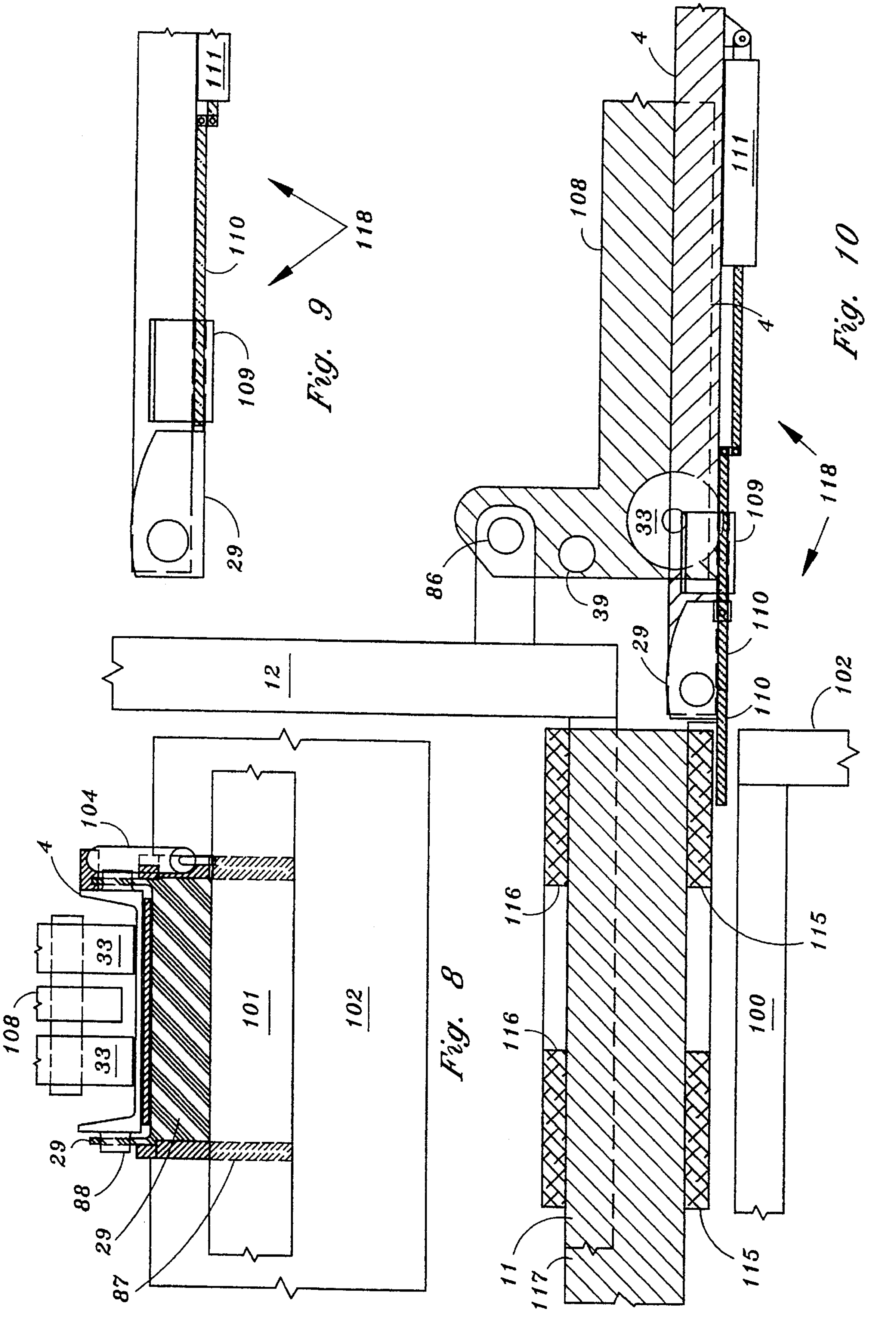
FIG. 8 is an end view of one platform rail with the shoe in a vertical position.
FIG. 9 is a side view of the platform rail with means to handle two-sided pallets in the absence of stake rails.
FIG. 10 is a side view of the same means in FIG. 9 deployed and engaged for handling two-sided pallets without stake pocket rails.

FIG. 8 shows an additional, smaller scale, end view of the rail of platform 4 with shoe 29 in a vertical position.

FIGS. 9 and 10 show details of the mechanism for providing platform support when handling two-sided pallets without stake pocket rails.

Handling two-sided pallets requires pivoting the shanks 12 at the mounts 86 to raise the forks so as to clear the bottom boards 115 above platform 4. (On two sided pallets, top boards 116 and bottom boards 115 are determined only by the orientation of pallet 17). In addition, an alternate means of supporting shoes 29 is required. Standard flat-bed semis have a stake pocket railing 101 lining both trailer side members 102 and welded to form a framework along the entire length of the semi, with openings to receive extensions 87 of shoes 29 when rotated about pivot point 88 to a vertical position. The figures also show two operating positions of cylinders 104, extended for vertical shoe and retracted for normal position or when shoes are on the ground.

FIGS. 9 and 10 are two profile views of the base support system 118 needed for loading and unloading two sided pallets on a vehicle without stake pocket railings. Base support plate 110 is shown retracted by cylinder 111 but still supported by retainer 109. FIG. 7 shows the width of this support plate 110 and passageway for movement between the top of shoe 29 and the bottom of platform 4 channel as well as the center mount position of cylinder 111. FIG. 10 shows an extended cylinder 111 having moved the base plate 110 to rest on the deck 100 of a vehicle in a gap provided when bottom boards 115 are raised at the outside of the pallet 117 by tines 11 of the fork lift carriage. Lifting slightly and tilting shanks 12 of the forks forward should cause the pallet to pivot thereby providing a gap for inserting the base support plate. The forks and the pallet load can then be pulled back to transfer the load to the carriage rollers 33 and the platform for movement to a normal carrying position of the fork lift. To place the pallet on the ground, the base plate 110 is withdrawn to allow the shoes to pivot to conform to the angle between the platform and the ground. High strength and hardened material should be used for base plates because these will support that portion of the load not borne by lifting cylinders 6.

An option for supporting the platform on a vehicle deck can be obtained with conventional prior art stabilizers shoes mounted on extensions of sleeves 20 and operated with the hydraulic system. With the wheel base extended this would provide vehicle support but not direct platform support so that lifting elements might require added strengthening and the capacity might be somewhat reduced. Also, stabilizers mounted on the frame would not be of benefit when the platform is at ground level—only platform shoes would be supportive then. The terrain must be suitable to use frame stabilizers, but slightly faster operations might result.

Figure 11:
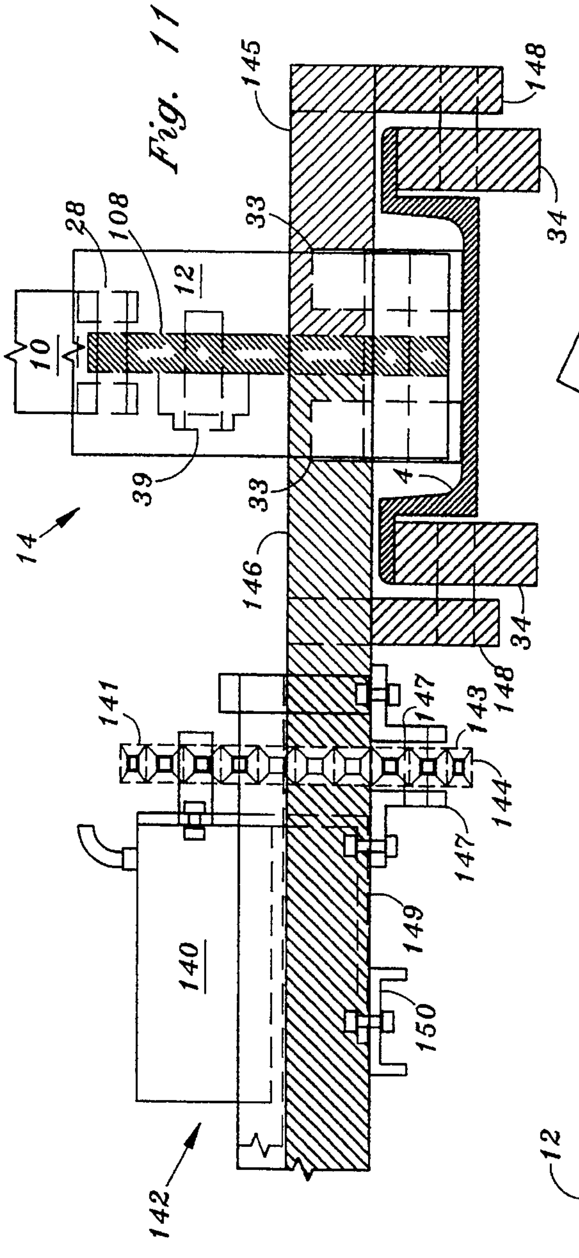
FIG. 11 is an end view of one half of the carriage assembly, including the motor drive mechanism, as seen from the proximate end of the platform.

FIG. 11 is an end view of half the carriage assembly 14 including motor drive mechanism.

Figure 12:
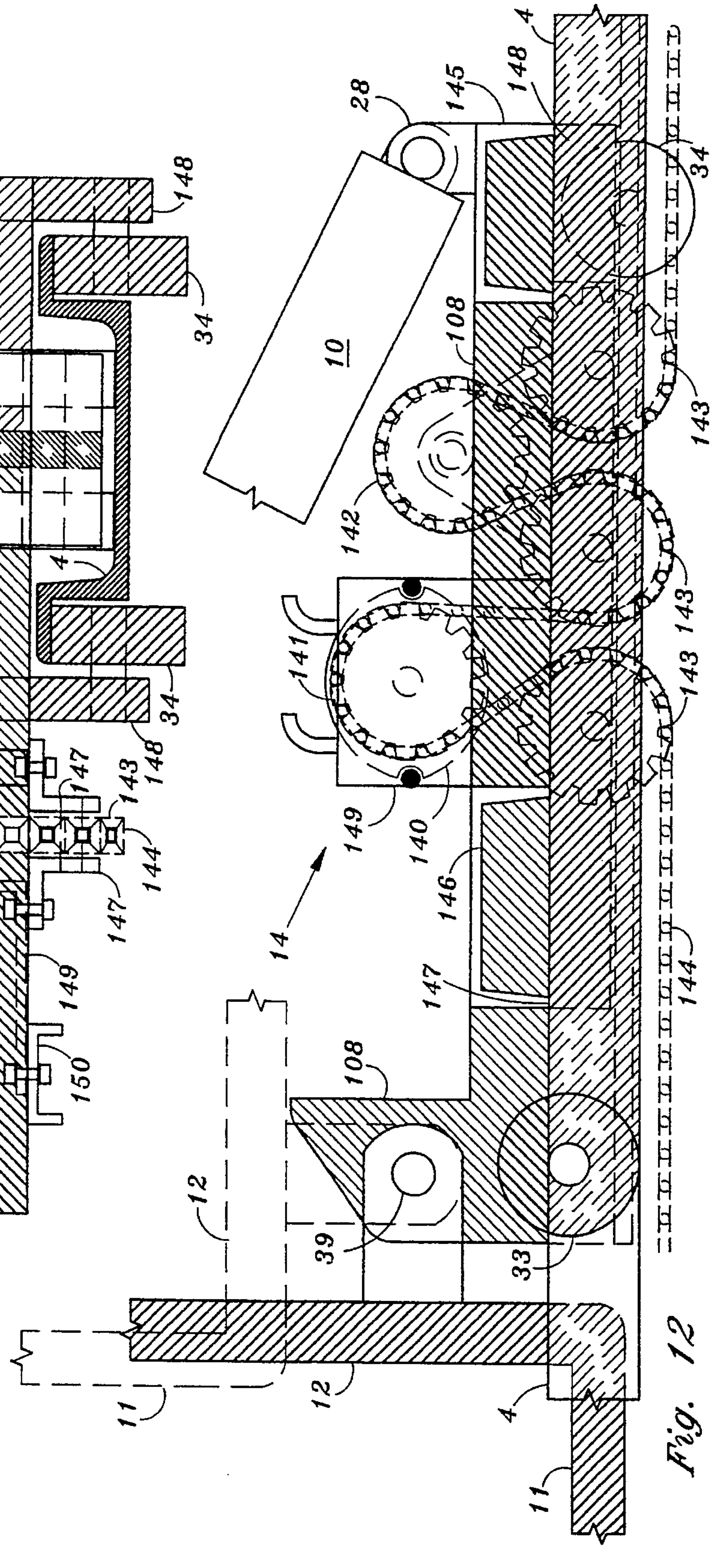
FIG. 12 is a side view of the carriage assembly on the platform.

FIG. 12 is a side view of the carriage assembly mounted on platform 4.

Figure 13:
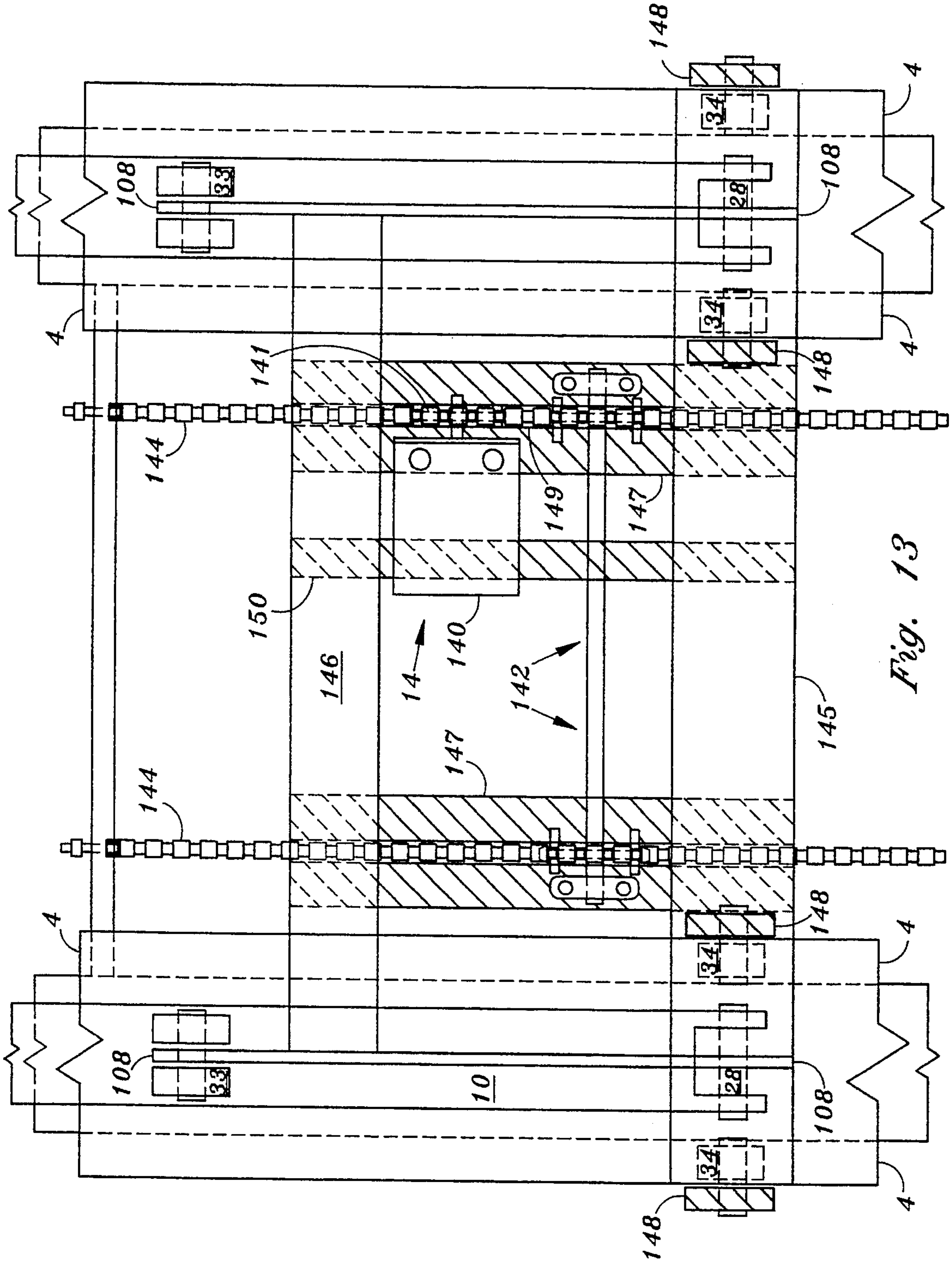
FIG. 13 is a plan view of the carriage assembly on the platform.

FIG. 13 is a top view of the carriage assembly over a portion of platform 4.

FIG. 11 illustrates a portion of the carriage assembly affixed to one rib 108 that supports fork shank 12 on mount 39. Also shown is one end of spanning structures 145 and 146 that join ribs 108 of the carriage assembly. Span 145 and 146 are structurally joined by members 147 and 150 which support flanged motor base 149, cross-over shaft assembly 142 with bearings and sprockets on each end, and also idler sprockets group 143 which sprockets are supported on flanges of angle members 147.

FIG. 12 shows the carriage drive mechanism. Motor 140 with attached sprocket 141 drives the carriage on chains 144 by means of an idler sprocket group 143 and cross-over assembly 142.

FIG. 13 shows the parallel arrangement of the main components and the framework of the carriage assembly. Cross-over assembly 142 serves to transmit the force exerted by motor sprocket 141 to the other side the carriage, each side having a group of idler sprockets 143 which engage chains 144.

Figure 14:
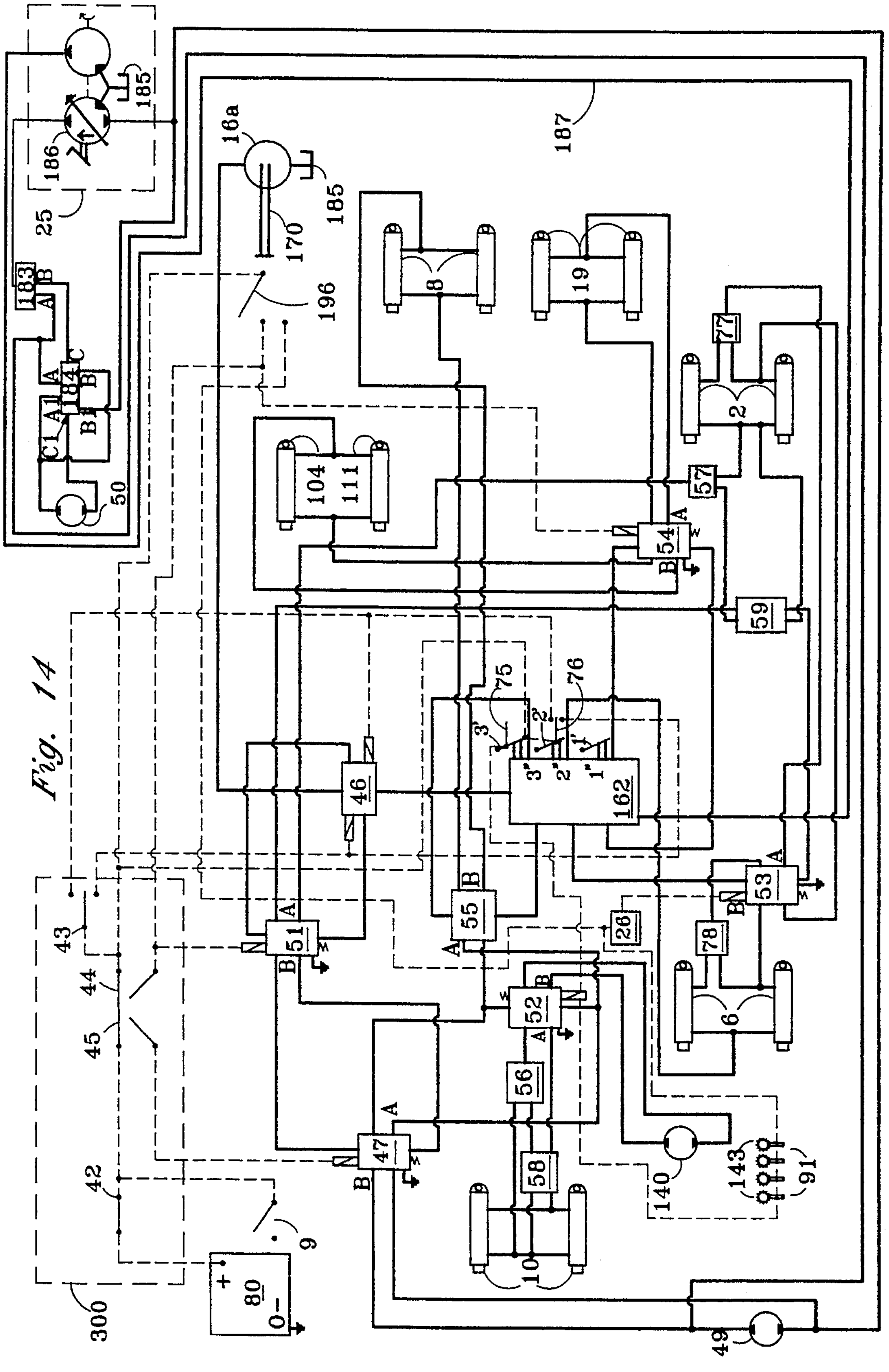
FIG. 14 is a diagrammatic scheme of the hydraulic system and the electrical circuitry.

FIG. 14 shows the complete diagrammatic of the hydraulic and electric circuitry, as well as the circuitry necessary for an alternative propulsion method.

The system features groups of directional and selector valves and other hydraulic components including flow control, flow dividers and customary pumps, and a reservoir. Directional valves of group 162 are three-spool, 4-way manual control, open center, series type with float position on spool 1". An electric operated solenoid 4-way directional valve, open center, is indicated by reference numeral 46. Electric solenoid double selector valves are designated by reference numerals 54, 53, 52, 51 and 47. Manual double selector valves are designated by reference numerals 55 and 184. Manual single selector valves are designated by reference numerals 56 and 57. A spool type flow divider is designed by reference numeral 183. Gear type flow dividers are designated by reference numerals 77 and 78. Locking valves are designated by reference numerals 58 and 59. Unit **16*a* has internal valving operated by tiller handle 170 and provides torque generation for power steering. Cylinders 2, 6, 8, 10, 19, 104 and 111 are all double acting, although cylinders 6** may be telescoping single acting.

Electric components are mainly switches, mounted on tiller handle 170, valve handles 2' and 3' of valve group 162 and in two remote protected boxes, one on the carriage and one on the frame 24. All external switches are weather proof and power is supplied by battery 80. A two position momentary push button switch 196 is provided on the end of the tiller handle 170 with a first position energizing selector solenoids of 54 and 51 and a second position energizing said two selectors plus solenoids of selectors 52 and 53. Switches 76 and 43 are rocker type, double throw, momentary, three position switches with switch 76 being mounted on handle 2' of valve group 162 and switch 43 being mounted in a remote box. All switches in one remote box 300 are duplicated in a second remote box (not shown). Reference numeral 75 indicates a push button switch, single throw, NO mounted on handle 3' of 162 and used to over-ride NC limit switches 91 which shut off current to selectors 52 when the carriage reaches its end of travel on the chain strands. The four switches of 91 are fastened on two chain strands 144 on both ends so that the idler sprockets 143 will depress the actuators for the limit switches with a tooth of the sprockets and are duplicated to give redundancy for safety. Limit switches 91 are wired in series so any one will interrupt current to the selectors 52.

Other switches include engine ignition switch 9 and those enclosed in protected boxes and used only when mounting the fork lift. These give remote control from both ends of the vehicle and allow the following controls: reference numeral 42 indicates an NC emergency switch that opens the circuit for ignition and allows remote shut down of the engine if required; reference numeral 45 indicates an NO, single throw, momentary switch to energize 47; reference numeral 44 indicates the same type of switch as indicated by reference numeral 45 and is used to energize 51, which is also controlled by 196 during normal operations; and switch 43 has the same functions as switch 76 but can be operated from remote locations. Reference numeral 26 indicates a timer for selector 53 limiting the stroke of the cylinders 2, 6 when tilting the platform laterally.

As shown in FIG. 14, non-propulsion actions utilize control valves of 162, moving handles of manual directional valves and selectors and operating switches for solenoid valves. Work ports of spool 1" of 162 are connected to the primary ports of 54 which, in the neutral or A side, supply cylinders 19 for axle movement, and in the B side, when energized by 196, route flow to cylinders 104 or 111 as needed. Spool 2" work ports of 162 serve one primary port of 53 and the retracting ports of cylinders 6. Moving the handle of spool 2" activates cylinders 6, raising or lowering platform 4 evenly by passage of fluid through flow divider 78. Some lateral tilting of platform 4 can be achieved by closing 196 to the second position, energizing 53 changing exit flow from 53 to by-pass 78 and permitting a short stroke of one cylinder 6 before timer 26 interrupts current flow after a brief interval to prevent excessive travel of the piston before timer 26 restores current to 53.

Reference numeral 76 indicates a control located on the handle of spool 2" of 162 and permits various simultaneous functions while operating spool 2". Control 76 operates valve 46 by engaging the rocker switch with the operator's thumb. Work ports of 46 serve the primary ports of selector 51. Normally, the "A" side of 51 supplies fluid to cylinders 2 which are regulated by a flow divider 77 like cylinders 6 and may be by-passed for lateral tilting of proximate end of platform 4 by the method described above for the cylinders 6. En route from 51A flow passes through 57 and 59 freely in normal operation but these units serve a purpose described below in mounting the fork lift. If 196 is pressed to energize 51, flow from 46 goes to primary ports of 47 and thence to 52 located on carriage assembly 14. Flow continues on to cylinders 10, passing unrestricted through 56 and 58 to permit tilting of the carriage forks. If 196 is pressed to the second position, 52 is energized and ports 52 B are connected to the motor 140, thus moving the carriage. However, this also energizes 53 so the handle of spool 2" should be released to neutral to avoid laterally tilting the platform through 53. When carriage forks are loaded, movement should be controlled by the spool handle 3' since the solenoid valves do not start moving heavy loads smoothly.

Work ports of spool 3" go to 55 and beyond to the primary ports of 52. Spool 3" can then control cylinders 10 as an alternative to using 46, and, when 52 is energized by second position of 196, spool 3" will also control motor 140. Switch 75 on the handle 3' of spool 3" is used to over-ride limit switches 91 by restoring interrupted current to 52. Since 55 is a manual double selector, to activate cylinders 8, selector should be in easy reach and moved to position B.

Beyond these operational movements provisions has been made to use the hydraulic system to mount the fork lift by including remote control positions that avoid awkward efforts otherwise made by the operator under the bed of the carrying vehicle. After preparations described in detail pertaining to reducing the profile of the fork lift have been accomplished, remote switches can perform all of the hydraulic functions for positions and mounting. Using 43 to operate 46, the fork lift can be driven under the semi-trailer deck and I beams by engaging 45 and 44 which energize 47 and 51 which allows fluid to reach the motor 49 for moving the fork lift into position. With extended cylinders 2 and 10 connected to stake pocket rail adapters 31, both pairs of cylinders 2 and 10 can be lifted into position by manually changing 57 and 56 to the ports that send fluid through the locking valves 58 and 59 instead of bypassing these as in normal operations. This safety procedure is important and easily achieved and secure since the locking valve will not permit cylinders to drift open but requires forced extension by hydraulic pressure. Safety chains would add an additional factor of safety.

Circuitry from the valves to the actuators is such that logical sequences of action can be combined with minimum hand change positioning and use of both hands in an easy, coordinated manner. Only three manual valves in group 162 should be less confusing to a novice.

Flow dividers work automatically according to their circuitry, but are by-passed to achieve certain objectives.

Cylinders 104 or 111 are interchangeable units used when servicing vehicles with two sided pallets, whether or not stake pocket railings are present. The cylinders 104 or 111 are used each time extra platform support is needed. Fold-down cylinders 8 are used mainly to lower and raise the superstructure of the fork lift for underslung carrying or for servicing vehicles with lower deck surfaces than standard flat-bed vehicles.

Because the cylinders 6 provide lifting motion in an arc it is necessary to tilt the fork during the arc to keep the load in a stable, horizontal position. This is readily accomplished with use of valve 46 and the above described selector position options.

Beyond these two functions, valve 46 may be used to provide lateral tilt or adjustment of the platform 4. This is an important function in at least two respects and can likely only be done with two or four cylinder lifting mechanisms. On rough surfaces where one tine of the forks may be forced out of level alignment with a pallet or load, it may be difficult to place the uneven forks beneath loads. Lateral adjustment can be used to correct this problem. When a load is carried in the normal position, but the fork lift is travelling along the side of a slope, the center of gravity of the load will have to be shifted to accommodate the angle of the slope. Adjustment can only be made to one side of platform 4 so that side must be raised or lowered to the desired angle. Also, movement of only one side of the platform 4 will cause twisting or torsion of the superstructure so a timing device should limit operation of 53 to perhaps one second on, two seconds off, in order to prevent excessive movement of the cylinders 6.

FIG. 14 shows a dual pump and engine assembly 25'. Dual pump capacity is preferable since the propulsion and non-propulsions systems require separate circuits to accommodate the demands for different volumes and pressures. The motors 49 and 50 of the propulsion system for driving the loaded vehicle use significantly more energy than the actuators of circuit 187 which comprise the remainder of the hydraulic system and the torque energizer unit **16*a* shown in FIG. 2**. This is state of the art differentiation made in hydraulic motor driven vehicles.

Pump 186 is an axial piston pump, pressure compensated with over-center, variable swash plate design. The swash plate may be controlled by a mechanical linkage to effect foot pedal manipulation, the pedal acting to control the direction and volume of fluid flow so that the motors will change direction, speed, and torque. The propulsion circuit fluid is first directed to flow divider 183, to selector valve 184, and to motor 49.

Fluid from port A of flow divider 183 is directed to port A of the double selector valve 184 and through the plumbing juncture to one port of the motor 49. Fluid from port B of the flow divider 183 is directed to port C of the valve 184. If position B of 184 is now selected, then the A side of the valve 184 is blocked and fluid entering port C moves internally to exit at port B and on to one port of motor 50. All wheel drive is thus achieved since both motors are pressurized on one port and opposite ports are able to return fluid passing through the motors back to pump 186. The motor 50 returns spent fluid through port C1 of 184, via an exit at port B1 of 184, the spent fluid joining flow from motor 49 and, exhausting through pump 186, returns to the reservoir 185.

Since the fluid volume is divided at flow divider 183 to service both motors, the amount of fluid to each motor is reduced, their speeds slowed and the torque increased. The equivalent of another gear ratio is thereby attained.

Selector 184 in the "A" position combines the volumes of fluid entering ports A and C of 184 and, in effect, by-passes divider 183 so that full flow enters motor 49 to drive the fork lift at the highest speed.

When motor 49 is the only motor used to drive the fork lift, motor 50 must be permitted to rotate freely. This may be done by using a motor 50 having a free-wheeling capability or by the free flowing circuit connecting both ports of motor 50 through the internal passage of selector 184 connecting A1 and C1.

Since provision has been made to operate from remote controls for mounting fork lift, a further extension of these controls could create possibilities of some robotics functions. Additional solenoid operated valves would be required to augment the manual valve system and provision would be needed to actuate the power steering unit with a small reversible electric motor. Then fork lift actions could be controlled at some distance by electric control lines or programmed for certain routine functions, operating a hydraulic system powered by motors, battery driven or by line current. For hazardous situations a radio signal control system is feasible; and with remote engine speed control, a full capacity fork lift operation is possible without operator risk.

Figure 15:
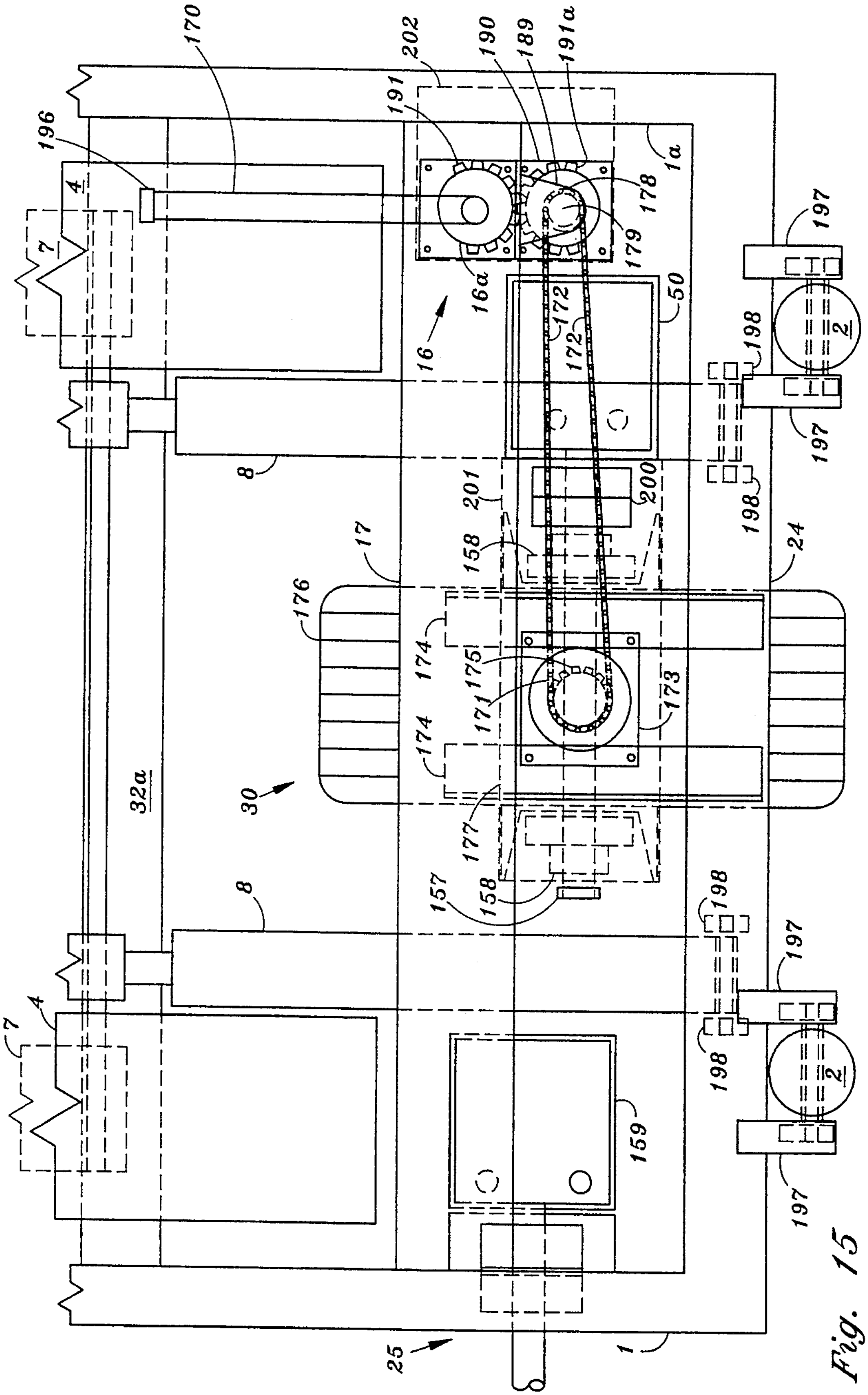
FIG. 15 is a plan view of a section of the chassis between the main frames showing the steering and driving mechanism for a single drive wheel and the position of the folded-down superstructure extending into this section.

FIG. 15 is an overhead view of a section of the chassis between the main frames showing the steering and driving mechanisms for a single wheel configuration, as well as the position of the folded down superstructure.

Figure 16:
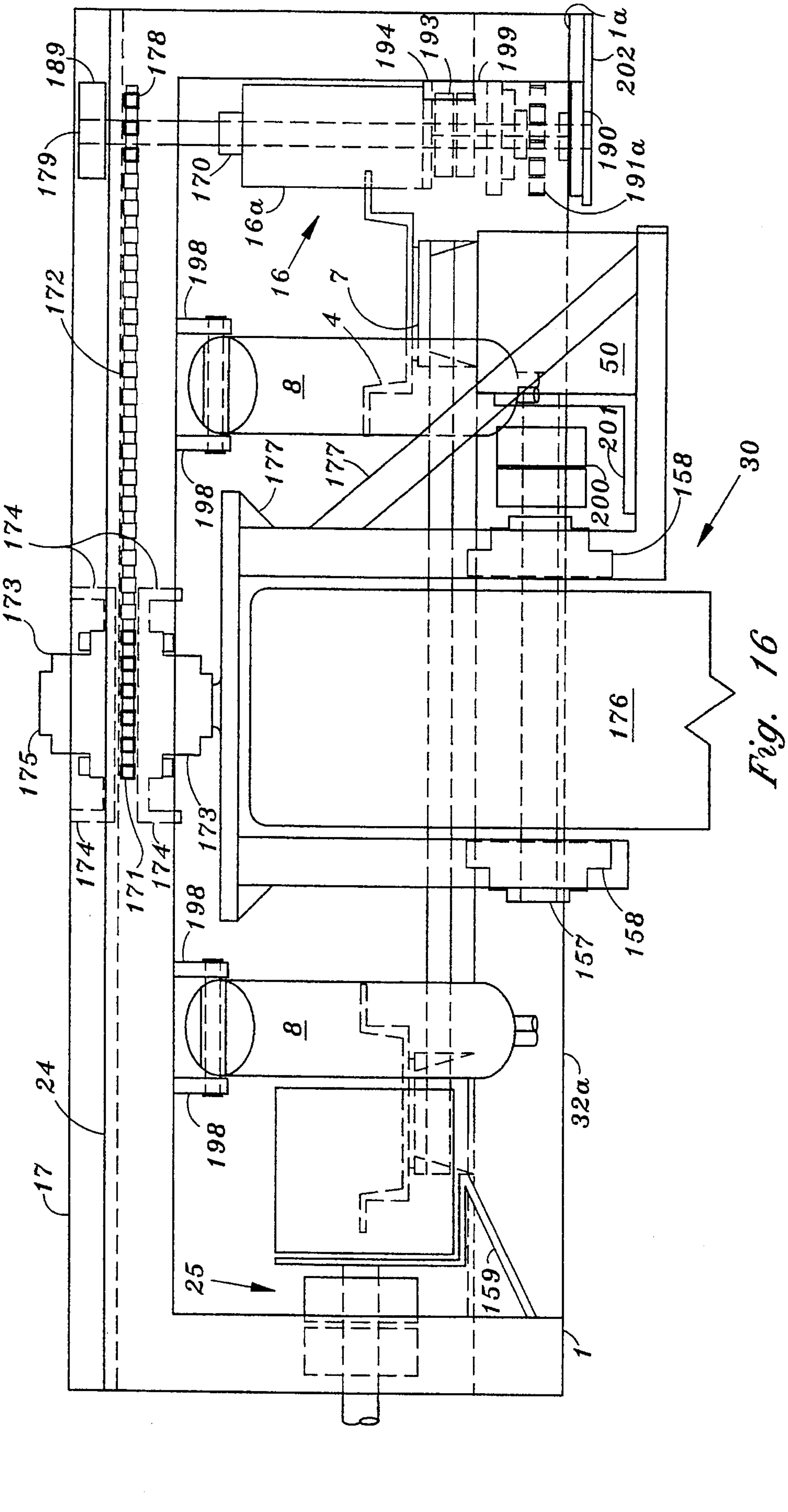
FIG. 16 is a single wheel end view of the same section of the chassis as shown in FIG. 15.

FIG. 16 is the single wheel end view of the same section shown in FIG. 15.

Figure 17:
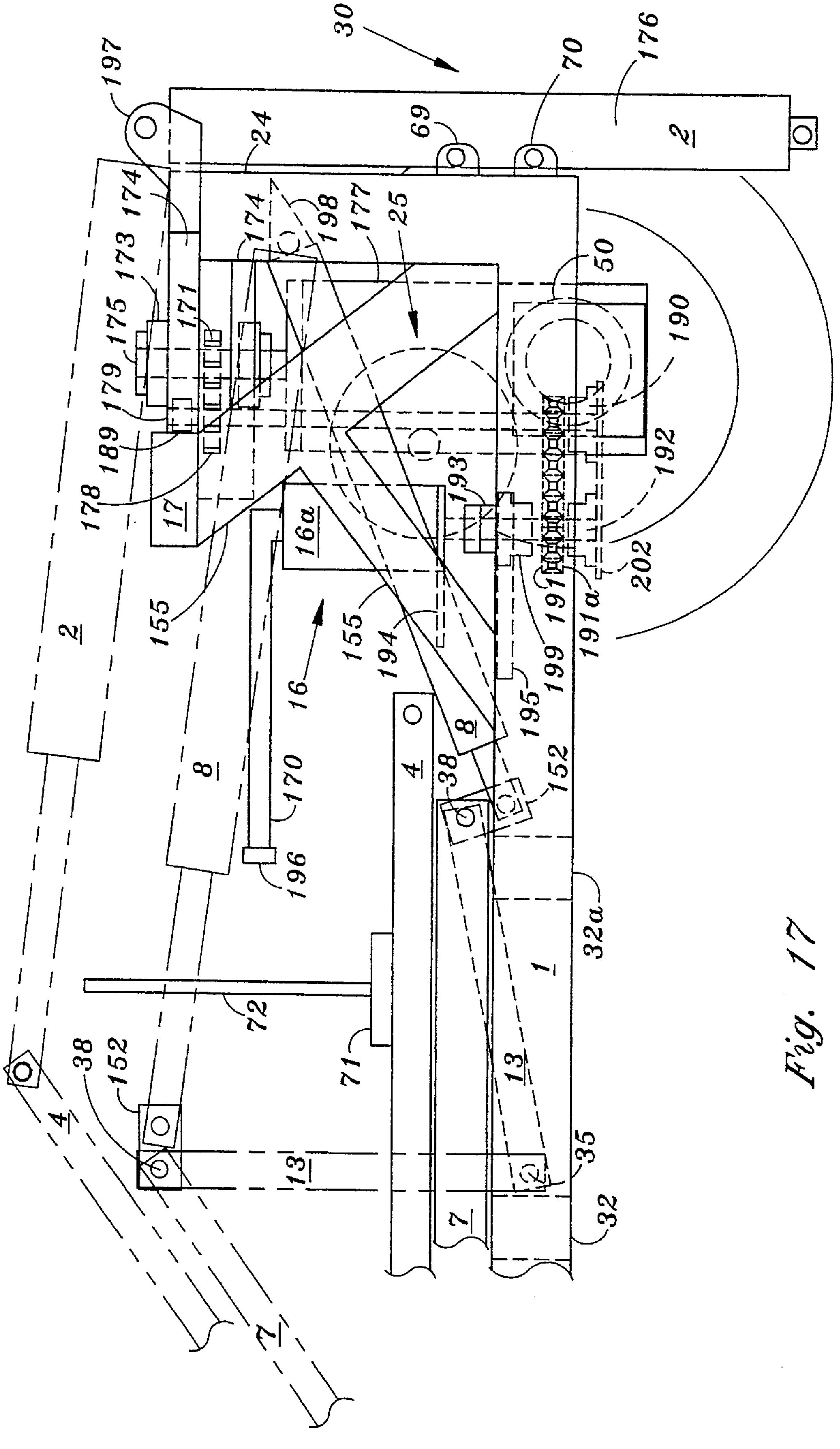
FIG. 17 is a profile view from the engine side of the same section of the chassis as shown in FIG. 15.

FIG. 17 is an engine side view of the same section shown in FIG. 15.

In FIG. 15 the sprocket and chain means used to steer the single wheel is shown. Steering is accomplished by moving tiller handle 170 to direction desired. Tiller operates torque energizer **16*a* for power steering but rotation is reversed through meshed gears 191 and 191*a*. So sprocket 178 on the same shaft 179 as driven gear 191*a* will drive chain 172 and turn wheel assembly 30 in proper direction, forward or reverse. Attachment of wheel assembly 30 to frames 24 and 17 is made through braces 174**.

The turning/steering assembly 16 also comprises the following parts: sprocket 171 is supported on shaft 175 which is welded to the frame arch 177 of assembly 30, and the sprocket 171 is driven by chain 172, connected to driving sprocket 178. Sprocket 178 is fixed to shaft 179, supported at the top by pillow block bearing 189 and at the bottom by flange bearing 190. Flange bearing 190 is supported by mounting base 202 welded to **1*a*. Also on shaft 179 is driven gear 191*a*, meshed with driving gear 191 attached to shaft 192 as shown in FIG. 17. Tiller handle 170 is attached to input shaft of torque energizer 16*a*** and has a two position switch affixed on handle end.

Mounts 197 are welded to frame 24 and support base ends of cylinders 2. Cylinders 2 are shown hanging vertically outside frame 24 as though being prepared for the transport mode. Extensions of platform 4 and lift arms 7 are shown in a folded-down position and attached to a retracted pair of cylinders 8.

FIGS. 15 and 16 show detail on the drive means for front tire 176. Motor 50 drives tire 176 through shaft 157 which is supported by bearings 158.

FIG. 16 omits cylinders 2 and shows cylinders 8 in retracted position but not connected to the outlined locations of platform 4 and lift arms 7. This is done to avoid confusing detail. Base mounts 198 of cylinders 8 are welded to frame 24. Bearings 173 are shown bolted to frames 174. The coupler 200 joins hub/wheel shaft 157 to driving motor 50, which is mounted on an angled structure 201 which is welded to wheel assembly arch 177 on horizontal and oblique supporting sections. More elements of steering assembly 16 are shown in profile. Included are energizer **16*a* and its support base 194 and coupler 193**.

FIG. 17 shows the juxtaposition of folded platform 4 and lift arm 7 to flange 71 of an I beam 72 of a semi when the fork lift is in a carried position. Cylinder 8 is shown at an oblique angle downward placing the attached fold-down stand 13 in a near horizontal mode parallel to frame 1 with the extended mount where cylinder 8 is attached to 152 below the frame 1 top. Shown in outline form are the normal operating positions of platform 4, lift arms 7 and cylinders 2 and 8. Cylinder 2 is shown hanging vertical as in preparation for carrying mode. Mounting plate 69 for use with tow bar and mounts 70 to support cylinders 2 in carrying mode are shown.

Support for upper bearing 199 of shaft 192 is shown as a base 195 welded to frame 1. Support for the torque energizer **16*a* is provided by bracket 194 welded to frame section 155. The coupler 193 joins torque energizer 16*a* to shaft 192** at the output end of the torque energizer.

Although the instant invention has been described in significant detail above, numerous modifications are possible without departing from the spirit and scope of this invention as described above and as defined in the claims which follow.

I claim:

1. An improved fork lift mechanism comprising:

at least three wheels having a variable wheelbase;

a frame supported by said at least three wheels;

a superstructure comprising:

a) a tilting and leveraged platform supported by said frame;

b) means for tilting and leveraging said platform connected to said frame;

c) a tilting and translating fork carriage supported by said platform for loading and unloading a load;

d) means for tilting and translating said fork carriage connected to said platform; and means, connected to said frame, for varying the wheelbase to safely and efficiently position the load during transportation, loading and unloading;

said superstructure being collapsibly attached to said frame; and an operator protection framework removably attached to said frame; and means, removably attachable to said fork lift, and being reattachable to said frame in combination with at least one tow adaptor and in combination with means for elevating at least one of said at least three wheels to form a tow bar for said fork lift.

2. An improved fork lift mechanism comprising:

at least three wheels having a variable wheelbase;

a frame supported by said at least three wheels;

a superstructure comprising:

a) a tilting and leveraged platform supported by said frame;

b) means for tilting and leveraging said platform connected to said frame;

c) a tilting and translating fork carriage supported by said platform for loading and unloading a load;

d) means for tilting and translating said fork carriage connected to said platform; and means, connected to said frame, for varying the wheelbase to safely and efficiently position the load during transportation, loading and unloading;

a tiller steering mechanism attached to a torque energizer; said torque energizer connected to a first sprocket; said first sprocket engagedly connected to a second sprocket; said second sprocket connected through a chain to a third sprocket;

said third sprocket connected to a steering shaft;

said steering shaft functionally connected to at least one of said at least three wheels.

3. An improved fork lift mechanism comprising:

at least three wheels having a variable wheelbase;

a frame supported by said at least three wheels;

a superstructure comprising:

a) a tilting and leveraged platform supported by said frame;

b) means for tilting and leveraging said platform connected to said frame;

c) a tilting and translating fork carriage supported by said platform for loading and unloading a load;

d) means for tilting and translating said fork carriage connected to said platform; and means, connected to said frame, for varying the wheelbase to safely and efficiently position the load during transportation, loading and unloading;

a hydraulic control system having:

a plurality of manually operated hydraulic valves and switch operated electric solenoid selector valves for combining and coordinating said hydraulic valves, said hydraulic valves being used to tilt said platform, to tilt and translate said fork carriage on said platform, to change said variable length wheelbase, and to drive at least one of said at least three wheels; and a remote switch mechanism for allowing hydraulic control at a remote location;

a combustion engine functionally connected to said hydraulic control system;

said hydraulic control system further having:

a means for hydraulic flow differential for distributing power from said combustion engine to all of said at least three wheels;

said means for hydraulic flow differential operationally connected to a first hydraulic motor;

said first hydraulic motor functionally connected to a mechanical differential connecting at least two of said at least three wheels;

said means for hydraulic flow differential operationally connected to a second hydraulic motor;

said second hydraulic motor functionally connected to at least one of said at least three wheels; and means for hydraulic flow volume control for providing the hydraulic equivalent of gears in a transmission.

4. An improved fork lift mechanism comprising:

at least three wheels having a variable wheelbase;

a frame supported by said at least three wheels;

a superstructure comprising:

a) a tilting and leveraged platform supported by said frame;

b) means for tilting and leveraging said platform connected to said frame;

c) a tilting and translating fork carriage supported by said platform for loading and unloading a load;

d) means for tilting and translating said fork carriage connected to said platform; and means, connected to said frame, for varying the wheelbase to safely and efficiently position the load during transportation, loading and unloading;

means for supporting said platform on elevated surfaces during loading and unloading, wherein said means for supporting comprises at least one shoe rotatably connected to a distal end of said platform and having means to supportively connect to a deck of a semi trailer; and hydraulic means rotatably connected between said distal end of said platform and said at least one shoe to control positional alignment of said at least one shoe.

5. An improved fork lift mechanism comprising:

at least three wheels having a variable wheelbase;

a frame supported by said at least three wheels;

a superstructure comprising:

a) a tilting and leveraged platform supported by said frame;

b) means for tilting and leveraging said platform connected to said frame;

c) a tilting and translating fork carriage supported by said platform for loading and unloading a load;

d) means for tilting and translating said fork carriage connected to said platform; and means, connected to said frame, for varying the wheelbase to safely and efficiently position the load during transportation, loading and unloading;

hydraulic means for operating said platform and said fork carriage, wherein said hydraulic means includes at least one hydraulic cylinder rotatably connected at one end thereof to said frame;

at least one lift arm rotatably connected at opposite ends thereof between said frame and said platform;

wherein said at least one hydraulic cylinder is rotatably connected to said at least one of said lift arms at an end of said at least one hydraulic cylinder opposite from said one end and at a point on said at least one lift arm substantially at a mid point thereof; and wherein said at least one lift arm is rotatably connected at a proximal end thereof to at least one fold down stand, and wherein said at least one fold down stand is rotatably connected to said frame.

6. An improved fork lift as recited in claim 5, further comprising at least a second hydraulic cylinder rotatably connected between said frame and said at least one fold down stand, said at least one fold down stand being retractable to a horizontal position.

7. An improved fork lift as recited in claim 6, further comprising at least a third hydraulic cylinder rotatably connected between a proximal end of said platform and a proximal end of said frame to raise said proximal end of said platform.

* * * * *